United States Patent [19]

Ushijima et al.

[11] Patent Number: 4,795,011
[45] Date of Patent: Jan. 3, 1989

[54] HYDRAULIC CONTROL DEVICE FOR HYDRAULICALLY OPERATED FRICTION CLUTCH HAVING DRAG PREVENTIVE MEANS

[75] Inventors: Fumihiro Ushijima, Okazaki; Kiyohito Murata, Susono, both of Japan

[73] Assignee: Toyota Jidosha Kabushiki Kaisha, Toyota, Japan

[21] Appl. No.: 61,657

[22] Filed: Jun. 15, 1987

[30] Foreign Application Priority Data

Jun. 19, 1986 [JP] Japan ................. 61-143827

[51] Int. Cl.⁴ .................. F16D 25/11; B60K 41/02
[52] U.S. Cl. ................. 192/0.032; 192/0.076; 192/3.58; 192/103 F
[58] Field of Search .............. 192/0.032, 0.076, 3.58, 192/85 AA, 103 F, 109 F, 111 A

[56] References Cited

U.S. PATENT DOCUMENTS

| 2,756,851 | 7/1956 | Collins | 192/0.076 X |
| 3,237,734 | 3/1966 | Jania | 192/0.076 X |
| 3,421,608 | 1/1969 | Van Gorder | 192/109 F X |
| 3,690,429 | 9/1972 | Honda | 192/85 AA |
| 4,083,442 | 4/1978 | Ushijima | 192/85 AA X |
| 4,646,891 | 3/1987 | Braun | 192/0.032 |

FOREIGN PATENT DOCUMENTS 60-11722 1/1985 Japan .
60-23660 2/1985 Japan .
676780 7/1979 U.S.S.R. ................. 192/85 AA Primary Examiner—Rodney H. Bonck
Attorney, Agent, or Firm—Oblon, Fisher, Spivak, McClelland & Maier

[57] ABSTRACT

A control device for a hyudraulic friction clutch for a motor vehicle, wherein a piston is moved by a pressurized fluid supplied to a pressure chamber, to effect frictional engagement between driving and driven rotary members, and a proximity shut-off valve is disposed in the piston, for permitting the fluid to be discharged from the pressure chamber through a discharge passage when the piston has reached a ready-to-operate position from which the piston is moved to start the frictional engagement. The control device includes a hydraulic pressure source generating a predetermined line pressure, a pressure adjusting device for adjusting the line pressure to a controlled clutch pressure, a clutch control valve for applying the controlled clutch pressure to the pressure chamber to advance the piston for effecting the frictional engagement of the rotary members, and a controller for commanding the pressure adjusting device to adjust the line pressure to a predetermined lower level, when the controller commands the clutch control valve to supply the pressurized fluid to the pressure chamber for moving the piston to the ready-to-operate position. Thus, drag due to partial engagement of the clutch with the piston at the ready-to-operate position is minimized or eliminated.

7 Claims, 6 Drawing Sheets

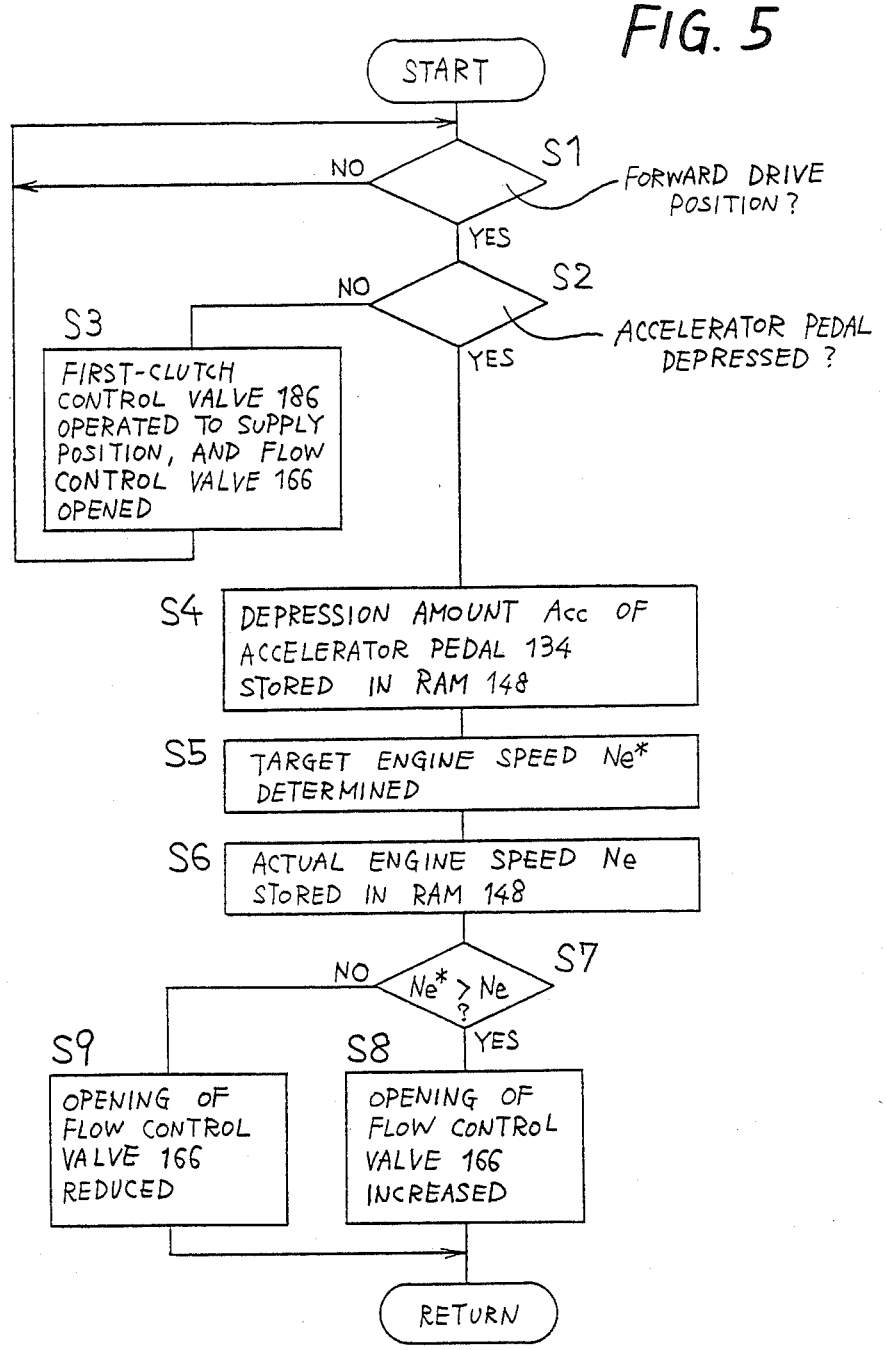

HYDRAULIC CONTROL DEVICE FOR HYDRAULICALLY OPERATED FRICTION CLUTCH HAVING DRAG PREVENTIVE MEANS

BACKGROUND OF THE INVENTION

1. Field of the Invention

The present invention relates generally to a hydraulic control device for a hydraulically operated clutch device for an automotive vehicle, and more particularly to a technique for preventing or minimizing drag due to partial frictional engagement between driving and driven rotary members of a friction clutch which is provided with an automatic wear compensating device for improved engagement response.

2. Discussion of the Related Art

There is known a hydraulically operated friction clutch which has a driving rotary member, a driven rotary member, a movable member movable in the axial direction of the rotary members, an an actuator piston axially slidably received within a cylinder bore, for moving the movable member to effect frictional engagement of the driving and driven rotary members. The actuator piston is exposed to a pressure chamber formed in the cylinder bore, so that the actuator piston is moved by a pressurized fluid supplied to the pressure chamber, where the movable member is axially moved to frictionally couple the driving and driven rotary members, to transmit a rotary motion of the driving member to the driven member. In this type of hydraulically operated friction clutch, the driving and driven rotary members are frictionally coupled to each other via a friction member, which is subject to progressive wear during use of the clutch. Therefore, the distance of movement of the piston required to commence frictional engagement of the driving and driven rotary members is inevitably increased. This means a progressive increase in the amount of flow of the working fluid supplied into the pressure chamber, resulting in an increased amount of time necessary to complete the frictional engagement of the clutch, or a longer response time of the clutch, upon starting of the vehicle or during a shifting operation of the transmission. To solve this drawback, there has been proposed an arrangement as described in Laid-Open Publication No. 60-23660, wherein the engagement starting position of the clutch which varies with the amount of wear of the friction member is detected and stored in a memory, so that the working fluid is supplied to the pressure chamber at a comparatively high rate to move the actuator piston to the engagement start position at a high speed, and the fluid supply rate is lowered after the piston has reached the engagement starting position. However, this arrangement requires a complicated control system.

In the meantime, the present inventors developed an improved friction clutch as disclosed in U.S. Patent Application filed Apr. 3, 1987, Ser. No. 033,616, claiming the priority of the corresponding Japanese Patent Application No. 61-78845 filed Apr. 4, 1986. This friction clutch has a driving rotary member, a driven rotary member, an actuator piston operable for frictional engagement between the driving and driven rotary members, a pressure chamber supplied with a controlled pressurized fluid to activate the actuator piston, and a proximity shut-off valve disposed in the actuator piston, for permitting the pressurized fluid to be discharged from the pressure chamber through a discharge passage when the actuator piston has reached a ready-to-operate position from which the actuator piston is moved to start the frictional engagement between the driving and driven rotary members. According to this arrangement, the movement of the actuator piston to frictionally couple the driving and driven rotary members is stopped at its ready-to-operate position of the piston, or the engagement start position is shifted according to the amount of wear of the clutch, to assure an improved response of the clutch irrespective of the amount of wear of the friction member. To effect the frictional engagement of the clutch, the discharge passage is closed to increase the pressure in the pressure chamber, thereby moving the actuator piston to frictionally couple the driving and driven rotary members.

However, the hydraulically operated friction clutch proposed in the above-identified U.S. Patent Application is not completely satisfactory. Described more specifically, the discharge passage connected to the pressure chamber by the shut-off valve usually includes a fluid passage formed so as to originate from the pressure chamber, through the housing of the clutch and/or the housing of the transmission coupled to the clutch, and a suitable conduit connected at its one end to the above fluid passage and at the other end to an oil reservoir under the atmospheric pressure. Since the discharge passage has a resistance to a flow of the fluid therethrough to the oil reservoir, there exists a pressure difference between the pressure chamber in the clutch and the oil reservoir even after the shut-off valve is opened to permit the pressurized fluid in the pressure chamber to be discharged to the oil reservoir. In other words, the pressure in the pressure chamber acting on the actuator piston is maintained at a comparatively high level above the atmospheric pressure even after the shut-off valve is opened. In this condition, therefore, the actuator piston is advanced from its ready-to-operate position in a direction to effect the frictional coupling of the clutch, since the pressure in the pressure chamber acting on one end of the actuator piston is higher than a substantially atmospheric pressure which acts on the other end of the piston. Consequently, the friction clutch suffers from drag due to partial frictional engagement of the driving and driven rotary members, even while the clutch is not commanded to be engaged. This drag or partial engagement of the clutch results in shortening the life expectancy of the clutch, and leads to unstable idling of the engine, or requires an increased fuel supply to the engine or assure stable idle running of the engine. Thus, the clutch arrangement previously proposed by the present inventors suffers from relatively low durability, and leads to relatively low fuel economy of the engine.

SUMMARY OF THE INVENTION

The present invention was made in the light of the foregoing drawbacks experienced in the applicants' own prior development proposed in the U.S. Patent Application identified above. It is therefore an object of the present invention to provide a hydraulic control device for a hydraulically operated friction clutch device of a type as proposed in the above-indicated U.S. Patent Application, which control device is adapted to minimize drag of the clutch due to partial frictional engagement of the driving and driven rotary members while the actuator piston is placed in its ready-to-operate position.

The above object of the invention may be achieved according to the principle of the present invention, which provides a hydraulic control device for a hydraulically operated friction clutch device for an automotive vehicle, the clutch device having at least one friction clutch each of which includes a driving rotary member, driven rotary member, an actuator piston operable for frictional engagement between the driving and driven rotary members, a pressure chamber supplied with a controlled pressurized fluid to activate the actuator piston, and a proximity shut-off valve disposed in the actuator piston, for permitting the pressurized fluid to be discharged from the pressure chamber through a discharge passage when the actuator piston has reached a ready-to-operate position from which the actuator piston is moved to start frictional engagement between the driving and driven rotary members, the hydraulic control device comprising: (a) a hydraulic pressure source for generating a pressurized fluid having a predetermined line pressure; (b) a pressure adjusting device for adjusting the line pressure to a controlled clutch pressure to be applied to the pressure chamber; (c) a clutch control valve for applying the controlled clutch pressure to the pressure chamber to advance the actuator piston for effecting frictional engagement of the driving and driven rotary members, the clutch control valve permitting the fluid to be discharged from the pressure chamber through the discharge passage, to permit the actuator piston to be retracted; and (d) control means for commanding the pressure adjusting device to adjust said line pressure to a predetermined lower level, when the clutch control valve is commanded by the control means to supply the pressurized fluid to the pressure chamber for moving the actuator piston to the ready-to-operate position. The predetermined lower level is lower than the controlled clutch pressure to be applied to the pressure chamber for effecting the frictional engagement of the driving and driven rotary members.

In the hydraulically operated friction clutch device controlled by the control device of the present invention constructed as described above, the actuator piston is stopped at the predetermined ready-to-operate position, by the proximity shut-off valve which senses the ready-to-operate position and causes the pressurized fluid to be discharged from the pressure chamber through the discharge passage when the ready-to-operate position is reached. Thus, the ready-to-operate position, at which the piston commences its advancing movement to effect the frictional engagement of the driving and driven rotary members of the clutch, is shifted as the wear of the friction member of the clutch is progressively increased. In other words, the actuator piston is placed in the ready-to-operate position, irrespective of the wear of the friction member. Further, when the clutch control valve is commanded to supply the pressurized fluid to the pressure chamber to move the actuator piston to the ready-to-operate position, the pressure adjusting device is commanded to reduce the line pressure to a sufficiently low level as compared with the pressure that is applied to actuate the piston for effecting the frictional engagement of the driving and driven rotary members. In other words, the pressure for advancing the piston to its ready-to-operate position is comparatively lower than that for advancing the piston from the ready-to-operate position to effect the frictional engagement of the clutch.

According to the instant control arrangement, therefore, the actuator piston placed in the ready-to-operate position is given a comparatively small thrust, because of a comparatively low pressure acting on the actuator piston. Accordingly, the drag of the clutch due to partial engagement of the driving and driven rotary members is eliminated or minimized. Thus, the present control device assures improved durability of the friction clutch device and enhanced fuel economy of the vehicle.

According to one feature of the invention, the hydraulic pressure source includes a hydraulic pump and a pressure relief valve for adjusting a delivery pressure of the hydraulic pump to the line pressure. The pressure adjusting device includes a clutch-pressure control valve which is disposed between the pressure relief valve and the clutch control valve and which has a control pressure chamber exposed to a control pressure. The clutch-pressure adjusting valve is adapted to establish controlled clutch pressure such that the controlled clutch pressure rises with an increase in the control pressure applied to the control pressure chamber. The pressure adjusting device further includes a flow control valve electrically connected to the control means and disposed in the discharge passage for controlling a rate of flow of the fluid discharged through the discharge passage from the pressure chamber of the actuator piston. The control pressure chamber of the clutch-pressure adjusting valve communicates with the discharge passage so that the pressure in the discharge passage is applied as the control pressure to to the control pressure chamber, whereby the clutch pressure generated by the clutch-pressure adjusting valve is adjusted. In this arrangement, the pressure in the pressure chamber can be maintained at the predetermined lower level for holding the actuator piston at the ready-to-operate position, by maintaining the opening of the flow control valve (i.e., rate of flow of the fluid through the discharge passage) at a corresponding level. Further, the pressure in the pressure chamber can be readily changed to increase the transmission torque of the clutch from zero to the maximum value during starting of the vehicle, by continuously changing the opening of the flow control valve. The operating speed of the engine can be changed while the transmission torque is varied with a changing level of the fluid pressure applied to the actuator piston.

In one form of the above feature of this invention, the clutch control valve has an inlet port adapted to receive the controlled clutch pressure generated by the clutch-pressure adjusting valve, an output port communicating with the pressure chamber of the actuator piston, and a spool for controlling fluid communication between the inlet and outlet ports. For reducing or absorbing a shock to be produced upon engagement of the driving and driven rotary members of the clutch, it is preferred to provide an accumulator between the inlet and outlet ports of the clutch control valve.

According to another feature of the invention, the vehicle has a transmission coupled to the clutch device and having shift positions including at least one forward drive position, and a shift lever for selecting one of the shift positions of the transmission. In this case, the control means includes a shift-position sensor for detecting the shift positions of the shift lever, and a controller operable to command the pressure adjusting device to adjust said line pressure to the predetermined lower level, when the shift-position sensor detects that the shift lever is placed in one of the at least one forward drive position.

According to a further feature of the invention, the vehicle has an accelerator pedal, and the control means includes an acceleration sensor for detecting an operating amount of the accelerator pedal, and a controller operable to command the pressure adjusting device to determine the controlled clutch pressure based on the operating amount of the accelerator pedal detected by the acceleration sensor. This arrangement permits smooth engagement of the clutch when the vehicle is started.

According to a yet further feature of the invention, the vehicle has an engine coupled to the clutch device, and an accelerator pedal, and the control means includes an acceleration sensor for detecting an operating amount of the accelerator pedal, a speed sensor for detecting the actual speed of the engine, and a controller operable to determine a target speed of the engine based on the detected operating amount of the accelerator pedal, and according to a predetermined relation between the operating amount of the accelerator pedal and the target engine speed. The controller commands the pressure adjusting device to determine the controlled clutch pressure so that the detected actual speed of the engine coincides with the determined target speed.

In accordance with another feature of the invention, the vehicle has an engine coupled to the clutch device, and the control means includes a speed sensor for detecting an actual speed of the engine, and a controller operable to command the pressure adjusting device to determine the controlled clutch pressure so as to cause the actuator piston to effect frictional engagement between the driving and driven rotary members such that a torque transmitted by the friction clutch is increased during starting of the vehicle, as a function of a difference between the actual speed of the engine detected while the engine is being started, and the actual speed of the engine detected while the engine is idling.

BRIEF DESCRIPTION OF THE DRAWINGS

The foregoing and other objects, inventions and advantages of the present invention will be better understood by reading the following detailed description of preferred embodiments of the invention, when considered in connection with the accompanying drawings, in which:

FIG. 5 is a flow chart explaining the operation of the hydraulic control device of FIG. 1;

DESCRIPTION OF THE PREFERRED EMBODIMENTS

Figure 1:
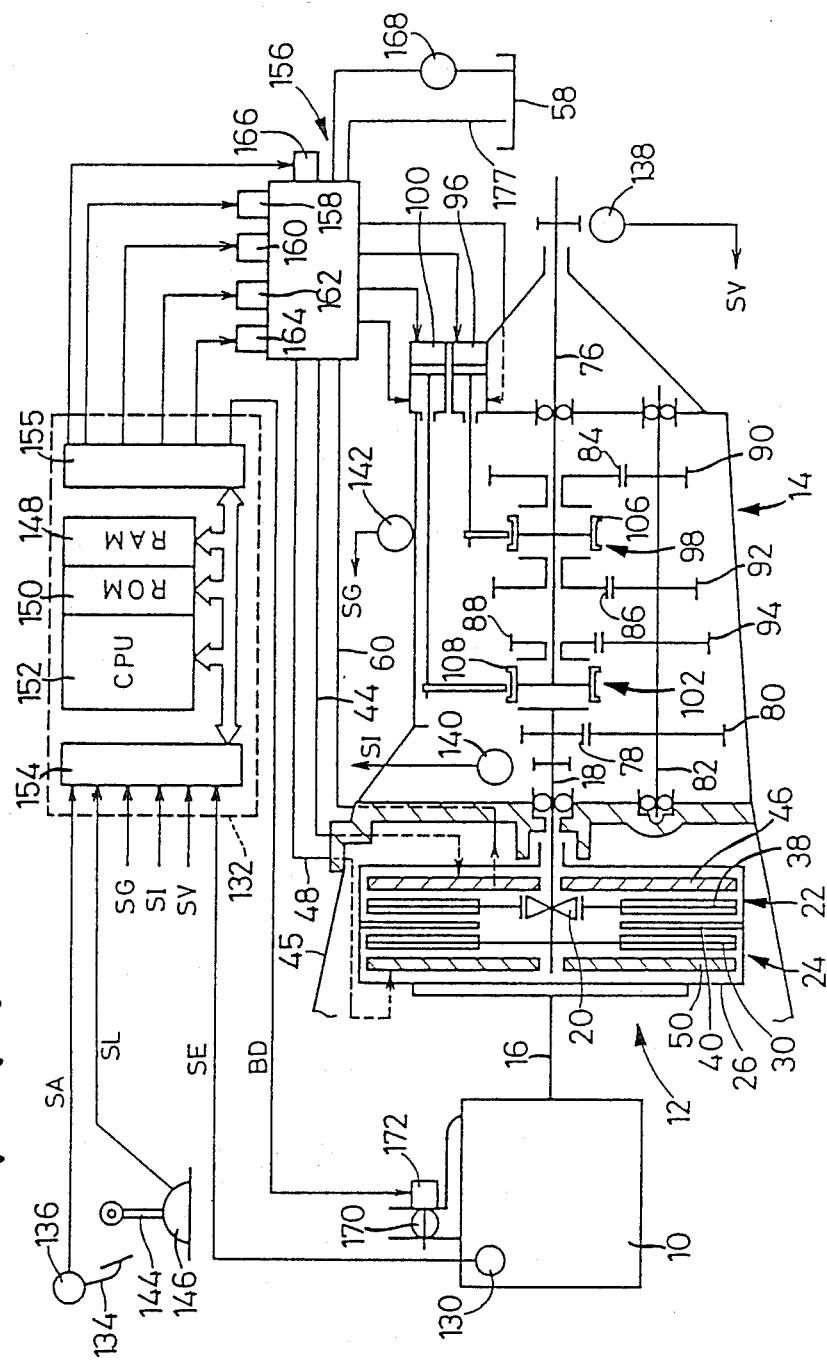
FIG. 1 is a schematic view showing a power transmitting system of an automotive vehicle, including a hydraulically operated friction clutch, and one embodiment of a hydraulic control device of the present invention for controlling the friction clutch.

Referring first to FIG. 1, there is shown a power transmitting system for an automotive vehicle wherein power produced by an engine 10 is transmitted to drive wheels of the vehicle via a friction clutch device 12, a constant-mesh transmission 14 having a plurality of reduction ratios, and a differential gear device (not shown), and other components.

The clutch device 12 is disposed between a crankshaft 16 of the engine 10, and an input shaft 18 of the constant-mesh transmission 14. The clutch device 12 includes a first clutch 22 and a second clutch 24 which are disposed in parallel relation with each other. The first clutch 22 has a one-way clutch 20 adapted to effect power transmission only in the direction from the engine 10 toward the constant-mesh transmission 14. The second clutch 24 is adapted to directly couple the crankshaft 16 and the input shaft 18 of the transmission 14, for applying an engine brake to the vehicle. The first clutch 22 is a hydraulically operated clutch which is controlled according to the principle of the present invention.

Figure 2:
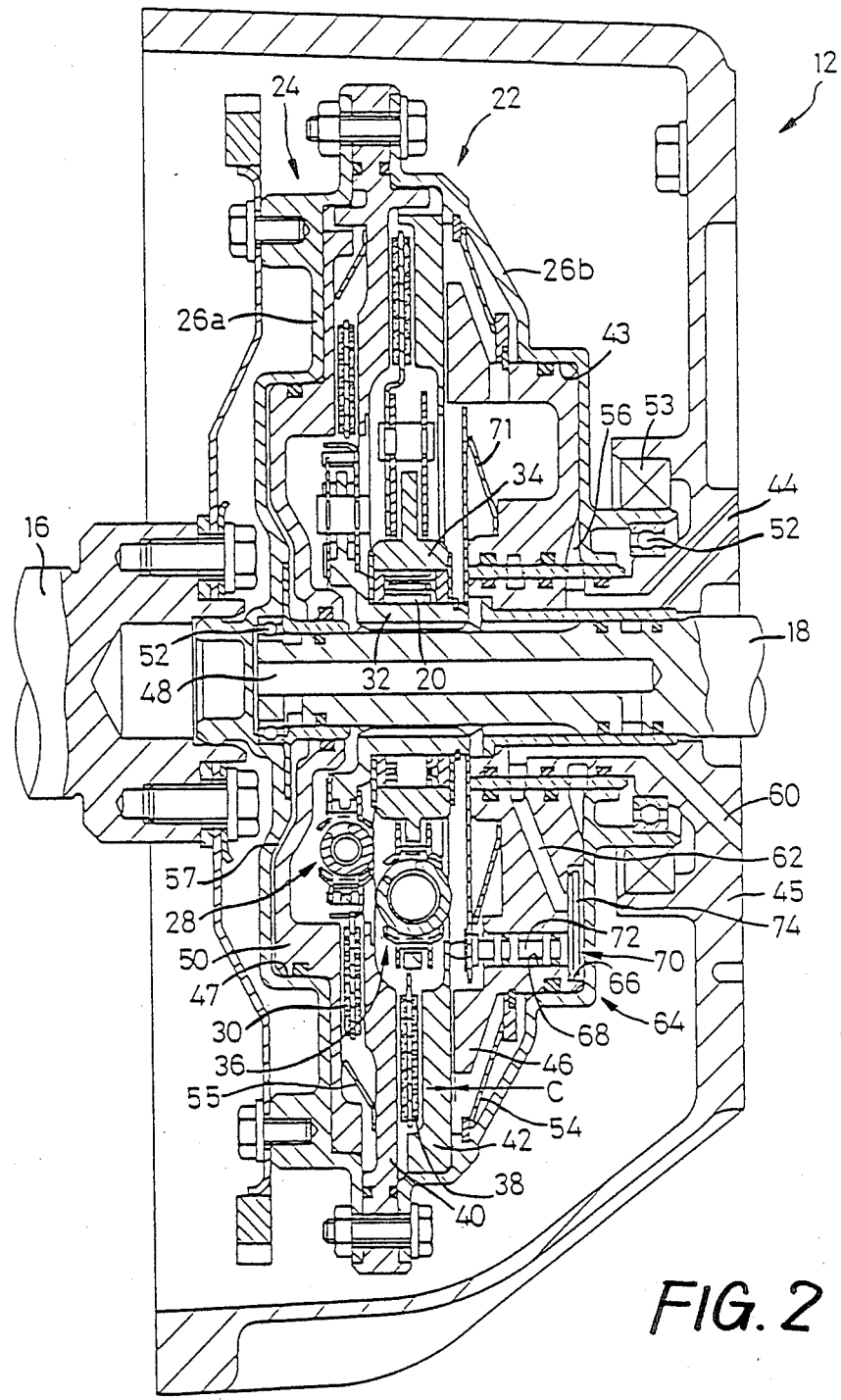
FIG. 2 is an elevational view in cross section of the friction clutch in the power transmitting system of FIG. 1.

Described more specifically referring to FIG. 2, the clutch device 12 has a clutch casing 26 which is attached to the end of the crankshaft 16 remote from the engine 10. The housing 26 accommodates the first and second clutches 22, 24, and the end portion of the input shaft 18 of the constant-mesh transmission 14. The casing 26 consists of elements 26a and 26b bolted together, and cooperates with a friction plate 40, a pressure plate 42, pistons 46, 50 (which will be described), and other elements, to constitute a driving rotary member. The input shaft 18 and the clutch casing 26 are arranged so that these two rotary members are rotatable relative to each other. The input shaft 18 has a second hub 32 splined thereto. The second hub 32 supports a second rotor 30 fixed thereto by means of a second damper 28. A first hub 34 is mounted on the second hub 32, with the one-way clutch 20 interposed therebetween, such that the first and second hubs 34, 32 are rotatable relative to each other. The first hub 34 is adapted to support a first rotor 38 fixed thereto by means of a first damper 36. Between the first and second rotors 38, 30 within the casing 26, there is disposed the annular friction plate 40 which is secured to the casing 26. To force the first rotor 38 against the friction plate 40, the pressure plate 42 is disposed such that the plate 42 is axially movable relative to the first rotor 38, and rotatable with the friction plate 40. The first and second rotors 38, 30 constitute a driven rotary member, and are lined with a friction material. Further, the pressure plate 42 also functions as a movable member which is axially movable to effect frictional engagement between the driving and driven rotary members.

A first cylinder bore 43 is defined within one end portion of the clutch casing 26 nearer to the input shaft 18 of the transmission 14. The annular first actuator piston 46 indicated above is received within the first cylinder bore 43, such that the piston 46 is axially slidable by pressurized working fluid supplied to a first pressure chamber 56 to which one end of the piston 46 is exposed. The pressurized fluid is supplied to the pressure chamber 56 through a fluid passage 44 formed in a clutch housing 45 and a housing for the transmission 14. The pressure plate 42 is activated directly by the first piston 46. Similarly, a second cylinder bore 47 is defined within the other end portion of the clutch casing 26 nearer to the crankshaft 16. The annular second actuator piston 50 is received in the cylinder bore 47, such that the piston 50 is axially slidable by a fluid supplied to a second pressure chamber 57 to which one end of the piston 50 is exposed. The fluid is supplied to this second pressure chamber 57 through a fluid passage 48 formed in the clutch housing 45 and the input shaft 18. With the fluid supplied to the second pressure chamber 57, the second actuator piston 50 is axially moved, so as to force the second rotor 30 against the friction plate 40. The first and second pistons 46, 50 are rotatable together with the clutch casing 26. Reference numerals 52, 53, 54 and 55 designate a bearing, an oil seal, a first return spring for biasing the first piston 46, and a second return spring for biasing the second piston 50, respectively.

The first actuator piston 46 has a control passage 62 which connects the first pressure chamber 56 defined in the first cylinder bore 43, and a discharge passage 60 for discharging the fluid to an oil reservoir 58. This control passage 62 is normally closed by a proximity shut-off valve 64 which is normally placed in its closed position. The shut-off valve 64 is moved to its open position to open the control passage 62, when the first actuator piston 46 has reached a predetermined position relative to the pressure plate 42. Described more particularly, the first piston 46 has a shallow round recess 66 in its pressure receiving surface exposed to the first pressure chamber 56. The round recess 66 communicates with one end of the control passage 62, and a through-hole 68 which is formed through the first piston 46. The shut-off valve 64 has a valving member 70 whose shaft portion 72 is axially slidably and fluid-tightly received within the through-hole 68. The valving member 70 has a closure member in the form of a circular flange portion 74 which is fixed to its one end on the side of the round recess 66, in eccentric relation with the shaft portion 72. The flange portion 74 is loosely fitted in the round recess 66, so as to close the open end of the control passage 62. The valving member 70 is so constructed that its other end remote from the flange portion 74 projects a predetermined small distance C, for example, about 0.5 mm, away from the operating surface of the first piston 46 facing the pressure plate 42, while the valving member 70 is positioned in its first position or fully closed position to close the control passage 62. In this arrangement, when the first piston 46 has reached a predetermined position about 0.5 mm away from the pressure plate 42, the valving member 70 contacts the pressure plate 42 at its end of the shaft portion 72. With a further advancing movement of the first piston 46, the valving member 70 is pushed back to its fully open position (in a direction toward the round recess 66) against the biasing action of a sheet spring 71, until the first piston 46 has abutted on the pressure plate 42. As a result, the flange portion or closure member 74 is moved away from the open end of the control passage 62, by a distance of about 0.5 mm. Thus, in the present embodiment, the proximity shut-off valve 64 includes the valving member 70, the round recess 66 and the through-hole 68, and the bottom surface of the round recess 66 constitutes a valve seat on which the closure member 74 is seated. Further, the end of the shaft portion 72 serves as an actuator protrusion for operating the shut-off valve 64. The components within the clutch casing 26 are lubricated with an oil supplied through an inlet port (not shown) formed through the casing 26, and the oil is discharged through an outlet port (not shown) to the reservoir 58 (exposed to atmosphere), so that the pressure within the casing 26 may be kept at a comparatively low level slightly above the atmospheric pressure.

Referring back to FIG. 1, the constant-mesh transmission 14 has an output shaft 76 disposed coaxially with the input shaft 18, and a countershaft 82 disposed parallel to the input and output shafts 18, 76. The countershaft 82 is driven by the input shaft 18 via a pair of gears 78, 80. The countershaft 82 has fixed thereto a first fixed gear 90, a second fixed gear 92 and a third fixed gear 94, which respectively engage a first rotatable gear 84, a second rotatable gear 86 and a third rotatable gear 88 that are mounted on the output shaft 76 such that these gears 84, 86, 88 can freely spin on the output shaft 76. With the countershaft 82 rotated by the input shaft 18 through the gears 78, 80, the third, second and first freely rotatable gears 88, 86 and 84 are rotated by the respective fixed third, second and third gears 94, 92 and 90, at different speeds that are lower than the speed of the input shaft 18, which different speeds of the third, second and first rotatable gears 88, 86 and 84 decrease in the order of description.

The output shaft 76 is provided with a first synchromesh device 98 actuated by a first hydraulic cylinder 96 for connecting the output shaft 76 to the second for first rotatable gear 86, 84, and a second synchromesh device 102 actuated by a second hydraulic cylinder 100 for connecting the output shaft 76 to the third rotatable gear 88 or the input shaft 18. With a first sleeve 106 of the first synchromesh device 98 moved to the right (in FIG. 1) by the first hydraulic cylinder 96, the first rotatable gear 84 is fixed to the output shaft 76, whereby the constant-mesh transmission 14 is placed in its first-speed gear position. With the first sleeve 106 moved to the left, the second rotatable gear 86 is fixed to the output shaft 76, whereby the transmission 14 is placed in its second-speed gear position. The second synchromesh device 102 has a second sleeve 108 which is moved by the second hydraulic cylinder 100. With the second sleeve 108 moved to the right, the third rotatable gear 88 is fixed to the output shaft 76, whereby the transmission 14 is placed in its third-speed gear position. With the second sleeve 108 moved to the left, the output shaft 76 is connected to the input shaft 18, whereby the transmission 14 is placed in its fourth-speed gear position. The transmission 14 further has other pairs of gears (not shown) which are actuated by respective hydraulic cylinders (not shown), for establishing a fifth-speed gear position, and a back-gear or reverse position.

Figure 3:
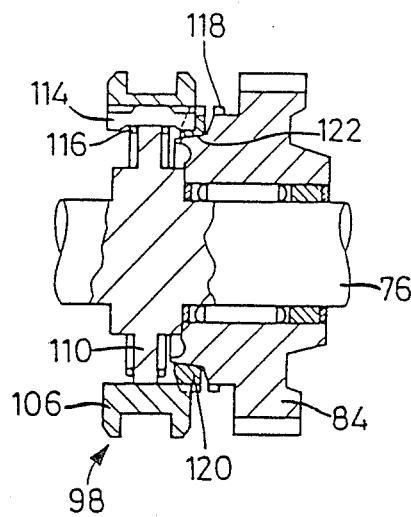
FIG. 3 is a fragmentary elevational view of the friction clutch, showing a synchromesh device of a constant-mesh transmission incorporated in the power transmitting system of FIG. 1.

The first and second synchromesh devices 98 and 102, which are structurally identical with each other, have a well known construction. By way of example, the first synchromesh device 98 is shown in FIG. 3, wherein the device 98 includes a hub 110 fixed to the output shaft 76; the above-indicated first sleeve 106 which is axially movable relative to the hub 110, and rotatable with the hub 110, and which is actuated by the first hydraulic cylinder 96; a key 114 formed on the inner surface of the first sleeve 106, so as to be movable with the sleeve 106; a spring 116 for biasing the key 114 in the radially outward direction; an external toothed portion 118 formed on the first rotatable gear 84; and a synchronizer ring 120 disposed between the first sleeve 106 and the external toothed portion 118. When the first sleeve 106 is moved toward the rotating first rotatable gear 84, the corresponding end of the key 114 comes into pressed contact with the synchronizer ring 120, thereby forcing the synchronizer ring 120 against a coned portion 122 formed on the first rotatable gear 84. As a result of frictional engagement of the synchronizer ring 120 with the coned portion 122, the hub 110 is synchronized with the external toothed portion 118. Then, the first sleeve 106 is further moved toward the first rotatable gear 84, whereby the first sleeve 106 is finally brought into engagement with the external toothed portion 118. In FIG. 3, a synchronizer ring, and other members provided on the side of the second rotatable gear 86 are not shown.

The engine 10 is provided with an engine-speed sensor 130, which generates an ENGINE-SPEED signal SE indicative of an operating speed Ne of the engine. Further, an accelerator pedal 134 of the vehicle is provided with an acceleration sensor 136, which generates an ACCELERATION signal SA indicative of an operating amount Acc of the accelerator pedal. The ENGINE-SPEED signal SE and ACCELERATION signal SA are fed to a controller 132. Adjacent to the output shaft 76 of the constant-mesh transmission 14, there is disposed a vehicle-speed sensor 138, which generates a VEHICLE-SPEED signal SV indicative of a rotating speed of the output shaft 76 which corresponds to a running speed V of the vehicle. This signal SV is also fed to the controller 132. Adjacent to the input shaft 18 of the transmission 14, there is disposed an input-shaft sensor 140, which generates an INPUT-SPEED signal SI indictive of a rotating speed Nin of the input shaft 18. The signal SI is also fed to the controller 132. The controller 132 also receives a GEAR-POSITION signal SG generated by a gear-position sensor 142 disposed near the transmission 14, and a SHIFT-POSITION signal SL generated from a shift-position sensor 146 provided on a shift lever 144. The GEAR-POSITION signal SG represents the currently selected gear position of the transmission 14, while the SHIFT-POSITION signal SL represents the currently selected shift position of the shift lever 144. The shift lever 144 is selectively placed in one of the following positions: PARKING (P); REVERSE (R); NEUTRAL (N); and four forward drive positions, i.e., DRIVE (D), THIRD GEAR (3), SECOND GEAR (2) and FIRST GEAR (L).

The controller 132 is constituted by a microcomputer which includes a random-access memory (RAM) 148, a read-only memory (ROM) 150, a central processing unit (CPU) 152, an input interface 154 and an output interface 155. The controller 132 cooperates with the above-indicted various sensors to constitute control means of the present hydraulic control device. The CPU 152 processes the input signals indicated above, according to a control program stored in the ROM 150, while utilizing a temporary data storage function of the RAM 148, and generates a DRIVE signal BD for controlling a throttle actuator 172 provided on the engine 10, and various other drive signals for controlling solenoid valves 158, 160, 162 and 164, and a flow control valve 166, of a hydraulic control circuit 156 for activating the clutch device 12 and the constant-mesh transmission 14. The hydraulic control circuit 156 includes a hydraulic pump 168 driven by the engine 10, for example, for supplying a pressurized fluid of a controlled pressure to the first and second hydraulic cylinders 96, 100, and the first and second clutches 22, 24 of the clutch device 12, according to the operations of the solenoid valves 158, 160, 162 and 164, and the flow control valve 166.

In an intake manifold of the engine 10, there is disposed a throttle valve 170 which is activated by the throttle actuator 172 indicated above. Normally, the throttle valve 170 is controlled in response to the DRIVE signal BD from the controller 132, so that the throttle opening D corresponds to the operating amount of the accelerator pedal 134. When the controller 132 receives an AUTOMATIC SHIFT-DOWN signal, the throttle valve 170 is closed for the period of time in which the first clutch 22 is disengaged.

Figure 4:
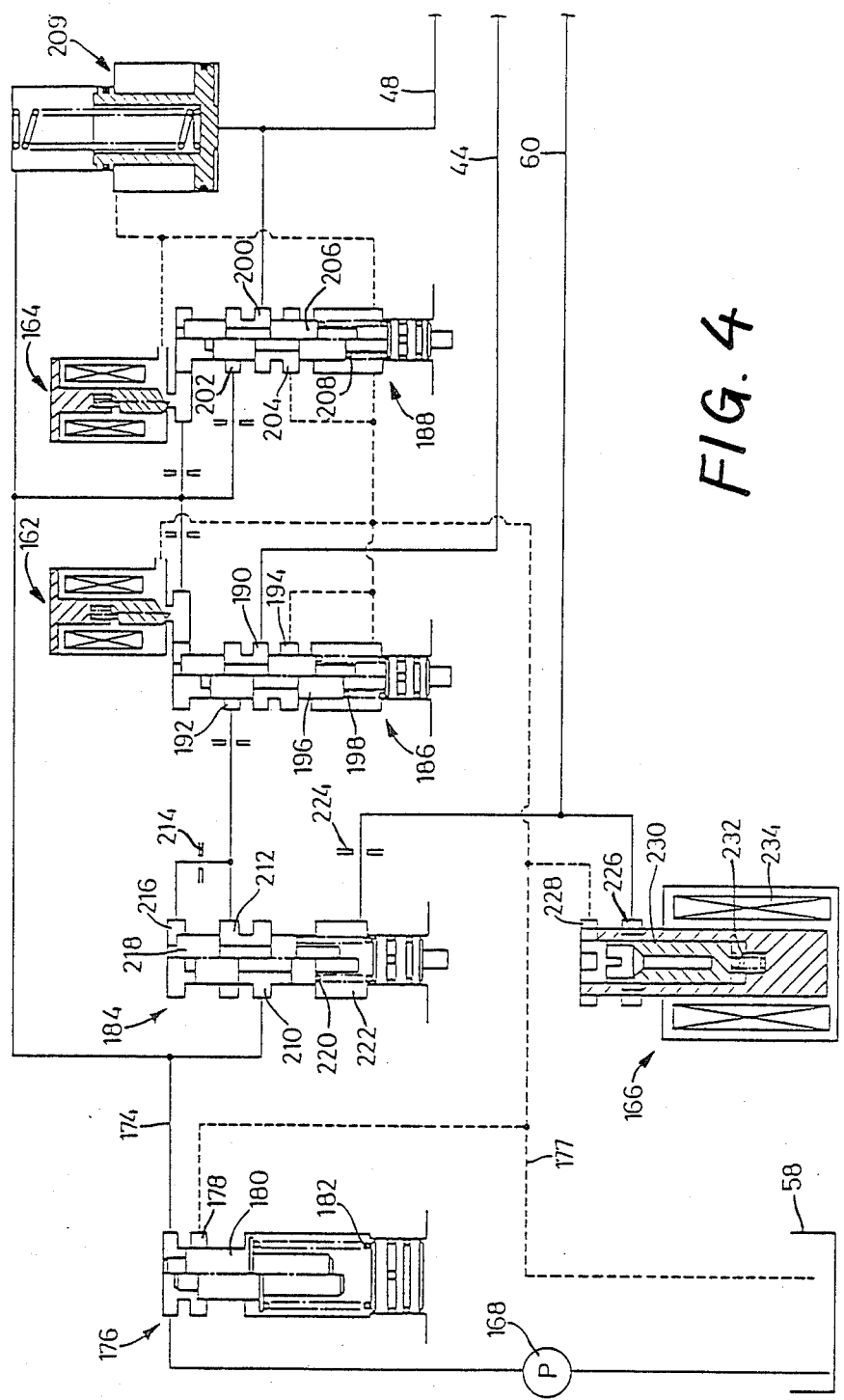
FIG. 4 is a diagram illustrating a hydraulic control circuit adapted for controlling the friction clutch of FIG. 1.

Referring next to FIG. 4, there will be described in detail a portion of the hydraulic control circuit 156 that is associated with the control of the clutch device 12.

The fluid delivered from the hydraulic pump 168 is fed through a line 174 to a pressure relief valve 176, whereby the pressure of the fluid is adjusted. Thus, the pump 168 and the relief valve 176 constitute a hydraulic source for generating a pressurized fluid of an adjusted pressure. The relief valve 176 includes a spool 180 operable between a closed and open position for controlling the communication between the line 174 and a drain port 178. The relief valve 176 further includes a spring 182 for biasing the spool 180 toward its closed position. The spool 180 is moved against the biasing action of the spring 182, permitting the fluid to be discharged through the drain port 178 into a drain line 177, when the line pressure, i.e., the pressure in the line 174, exceeds a predetermined upper limit, for example 10 Kg/cm$^2$. Namely, the pressure relief valve 176 functions to prevent an excessive rise of line pressure above the predetermined upper limit.

The line pressure established by the relief valve 176 is applied to a first-clutch control valve 186 via a clutch-pressure adjusting valve 184, and is also applied to a second-clutch control valve 188 directly. The first-clutch control valve 186 includes an output port 190 communicating with the first pressure chamber 56 through the fluid passage 44; an inlet port 192 to which the fluid is supplied through the clutch-pressure adjusting valve 184; a drain port 194 communicating with the drain line 177; a spool 196 operable between its supply and discharge positions, for selective communication of the output port 190 with the inlet port 192 or the drain port 194; and a spring 198 for biasing the spool 196 to its supply position in which the fluid is supplied from the output port 190. When the solenoid valve 162 described above is placed in its deenergized position, the line pressure is applied to one of opposite ends of the spool 196, to hold the spool 196 in its discharge position against the biasing force of the spring 198, whereby the fluid is discharged from the first pressure chamber 56 of the first clutch 22. Upon energization of the solenoid valve 162, the line pressure which has acted on the spool 196 is released into the drain line 177, whereby the spool 196 is moved by the biasing force of the spring 198, to its supply position for supplying the line pressure through the output port 190 to the first pressure chamber 56.

The second-clutch control valve 188 is constructed in the same manner as the first-clutch control valve 186. That is, the control valve 186 includes an output port 200 communicating with the second pressure chamber 57 of the second clutch 24 through the fluid passage 48; an inlet port 202 connected to the line 174; a drain port 204 connected to the drain line 177; a spool 206 operable between its supply and discharge positions, for selective communication of the output port 200 with the inlet port 202 or the drain port 204; and a spring 208 for biasing the spool 206 to its supply position in which the fluid is supplied from the output port 200. When the solenoid valve 164 described above is placed in its deenergized position, the line pressure is applied to one of opposite ends of the spool 206, to hold the spool 206 in its discharge position against the biasing force of the spring 208, whereby the fluid is discharged from the second pressure chamber 57 of the second clutch 24. Upon energization of the solenoid valve 164, the line pressure which has acted on the spool 206 is released into the drain line 177, whereby the spool 206 is moved by the biasing force of the spring 208, to its supply position for supplying the line pressure through the output port 200 to the second pressure chamber 57.

For assuring a slow rise in the pressure of the fluid to be applied to the second clutch 24, an accumulator 209 is connected between the inlet port 202 and the output port 200 of the second-clutch control valve 188. Thus, a shock generated due to a sudden rise in the fluid pressure in the second pressure chamber 57 for engagement of the second clutch 24 may be reduced.

The clutch-pressure adjusting valve 184 includes an inlet port 210 connected to the line 174; an output port 212 connected to the input port 192 of the first-clutch control valve 186; a feedback port 216 to which the output pressure from the output port 212 is applied through a restrictor 214; a spool 218 operable for controlling the communication between the inlet port 210 and the output port 212; a spring 220 for biasing the spool 218 toward its open position; and a control pressure chamber 222 connected to the previously indicated passage 60 through a restrictor 224, to apply a control pressure to the spool 218 in a direction toward the open position. Since the spool 218 is positioned according to the formula (1) indicated below, an output pressure or first clutch pressure Po (pressure applied to the first clutch 22) is controlled according a formula (2) also indicated below.

$$Po \cdot S = Pc \cdot S + F \quad (1)$$

$$Po = Pc + F/S \quad (2)$$

where,
  S: pressure-receiving area of the upper and lower end faces of the spool 218
  F: biasing force of the spring 220
  Pc: control pressure applied to the control pressure chamber 222

The fluid passage 60 is connected to the drain line 177 through the flow control valve 166, so that the control pressure Pc in the passage 60 is adjustable according to a flow control operation of the flow control valve 166. The flow control valve 166 includes an inlet port 226 connected to the passage 60; an outlet port 228 connected to the drain line 177; a spool 230 operable for continuously varying the cross sectional area of fluid communication between the inlet and outlet ports 226, 228; a spring 232 for biasing the spool 230 toward its closed position; and a solenoid coil 234 for moving the spool 230 against the biasing force of the spring 232. In the present embodiment, the clutch-pressure control valve 184 and the flow control valve 166 constitute a pressure adjusting device for controlling the first-clutch pressure Po to be applied to the first clutch 22.

It is noted that the spools 180, 196, 206 and 218 are shown in their two different positions, one position being shown on the left side of the centerline indicated, and the other position on the right side.

There will be described an operation of the present embodiment of the hydraulic control device.

The CPU 152 selects one of control programs according to the status of the vehicle, which control programs are adapted to control the power transmitting system while the engine 10 is idling, while the vehicle is started, while the constant-mesh transmission 14 is shifted, while the vehicle is running with an engine brake applied, etc. Operation upon starting of the vehicle will now be described, referring to the flow chart of FIG. 5.

Initially, the CPU 152 executes step S1 to determine whether the shift lever 144 is placed in any one of the forward drive positions. If an affirmative decision is obtained, step S1 is followed by step S2 to check if the accelerator pedal 134 has been depressed or not. Normally, the accelerator pedal 134 has not yet been depressed when the shift lever 144 is moved to one of the forward drive positions. Accordingly, a negative decision is normally obtained in step S2, and the CPU 152 goes to step S3 in which the solenoid valve 162 is energized to move the first-clutch control valve 186 to its supply position, and thereby supply the first-clutch pressure Po from the clutch-pressure adjusting valve 184 to the first pressure chamber 56 of the first clutch 22. At the same time, the flow control valve 166 is opened to maintain the control pressure Pc in the passage 60, at the minimum level substantially equal to atmospheric pressure. In this condition, the first-clutch pressure Po produced by the clutch-pressure adjusting valve 184 is usually 2 Kg/cm².

As a result, the first actuator piston 46 of the first clutch 22 is advanced by the first-clutch pressure Po, whereby the spool 70 of the proximity shut-off valve 64 pushes the pressure plate 42 toward the first rotor 38, to first eliminate a gap between the pressure plate 42 and the first rotor 38. Then, the spool 70 is pushed back relative to the piston 46, and the flange portion or closure member 74 is spaced away from the surface of the first piston 46 which defines the bottom of the round recess 66, whereby the control passage 62 communicates with the first pressure chamber 56. Thus, the pressure in this chamber 56 is lowered below 2 Kg/cm². Therefore, the first actuator piston 46 is stopped at the ready-to-operate position, with the shut-off valve 64 placed in the open position. It is preferred that the pressure to be applied to the first pressure chamber 56 for moving the actuator piston 46 to the ready-to-operate position be as low as possible, provided that the first piston 46 can be moved to the ready-to-operate position. If the clutch pressure Po generated by the clutch-pressure adjusting valve 184 is about 2 Kg/cm², and if a pressure drop or loss due to a flow resistance between the line 174 and the first pressure chamber 56 is equal to a pressure drop or loss in the discharge passage (62, 60, 177) between the pressure chamber 56 and the reservoir 58, the pressure in the pressure chamber 56 when the actuator piston 46 is at the ready-to-operate position is in the neighborhood of 1 Kg/cm², since the end of the drain line 177 on the side of the reservoir 58 is exposed to atmospheric pressure.

As described above, when the first actuator piston 46 is moved to its ready-to-operate position, the CPU 152 commands the flow control valve 166 of the hydraulic control circuit 156 to be opened, in order to apply a predetermined low pressure to the first pressure chamber 56. Therefore, the pressure in the pressure chamber 56 is sufficiently low while the actuator piston 46 is located at the ready-to-operate position. This is not so in the conventional arrangement wherein the pressure in the pressure chamber is maintained at a relatively high level even after the shut-off valve is opened to drain the pressure chamber, since there exists a flow resistance (pressure loss) in the discharge passage (62, 60, etc.) between the pressure chamber (56) and the reservoir (58). Accordingly, the thrust of the first piston 46 is maintained at a sufficiently low level, and a drag torque of the first clutch 22 in the above condition is minimized, whereby the life expectancy of the clutch 22 is increased. Further, the reduction in the drag torque of the first clutch 22 permits a stable idling speed of the engine 10 without an increase in the amount of a fuel supply to the engine, resulting in an improvement in the fuel economy of the vehicle.

Figure 6:
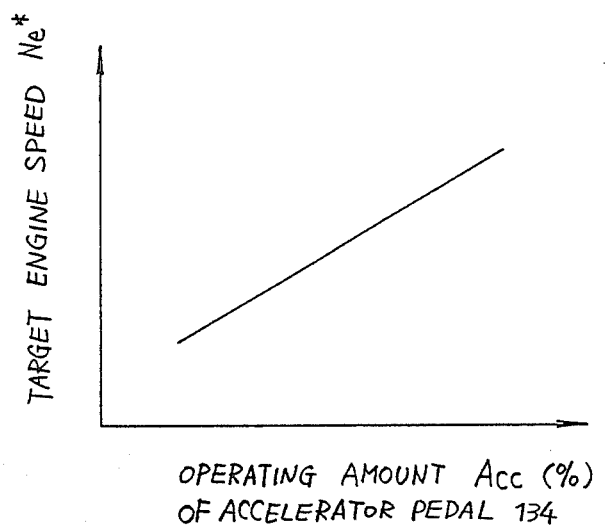
FIG. 6 is a graphical representation of a relationship used in a program shown in the flow chart of FIG. 5.

When the accelerator pedal 134 is depressed after the above-indicated operation of the shift lever 144, the depression of the pedal 134 is detected in step S2, whereby step S2 is followed by step S4 wherein the operating amount Acc of the pedal 134 is stored in the RAM 148, according to the ACCELERATION signal SA from the acceleration sensor 136. Then, the CPU 152 goes to step S5 in which a target or desired speed Ne* of the engine 10 is determined, based on the detected operating amount Acc, and according to a predetermined relation between the operating amount Acc and the target engine speed Ne*, as shown in FIG. 6, for example. The relation shown in FIG. 6 is determined so as to provide a desired drive force for starting the vehicle, with maximum fuel economy. Step S5 is followed by step S6 in which the actual speed Ne of the engine 10 is stored in the RAM 148, according to the ENGINE-SPEED signal SE generated by the engine-speed sensor 130. Then, steps S7 and S8, or steps S7 and S9 will be executed to control the opening of the flow control valve 166, so as to zero the difference between the target engine speed Ne* and the actual engine speed Ne.

More specifically, step S7 is executed to check if the target engine speed Ne* is higher than the actual engine speed Ne, or not. If the target engine speed Ne* is higher than the actual engine speed Ne, the CPU 152 goes to step S8 in which the opening of the flow control valve 166 is increased, to lower the control pressure Pc to be applied to the control pressure chamber 222 of the clutch-pressure control valve 184. As a result, the first-clutch pressure Po to be applied to the first pressure chamber 56 of the first clutch 22 is reduced, and the torque to be transmitted by the first clutch 22 is reduced. Consequently, the actual engine speed Ne is elevated toward the target engine speed Ne*. Conversely, if the checking step in step S7 reveals that the target engine speed Ne* is equal to or lower than the actual engine speed Ne, step S7 is followed by step S9 in which the opening of the flow control valve 166 is reduced, to raise the control pressure Pc to be applied to the control pressure chamber 222. Accordingly, the first-clutch pressure Po to be applied to the first pressure chamber 56 of the first clutch 56 is raised, and the torque transmitted by the first clutch 22 is increased. As a result, the actual engine speed Ne is lowered toward the target engine speed Ne*.

As described above, the first piston 46 is moved to its ready-to-operate position before the first clutch 22 is engaged, upon starting of the vehicle. Therefore, the engagement of the first clutch 22 can be controlled with a high response to the operation of the flow control valve 166. Further, the positioning of the first piston 46 at its ready-to-operate position by the proximity shut-off valve 64 does not require a complicated control arrangement in which the piston 46 is controlled according to updated stored data indicative of the operating stroke of the piston 46 necessary to bring it to the ready-to-operate or engagement start position, which varies with the amount of wear of the friction member of the first clutch 22.

Further, the target engine speed Ne* is determined depending upon the depression amount Acc of the accelerator pedal 134, and the opening of the flow control valve 166 is controlled so that the actual engine speed Ne coincides with the determined target engine speed Ne*. In other words, the opening of the flow control valve 166 is changed as a function of the detected operating amount Acc of the accelerator pedal 134, in order to adjust the first-clutch pressure Po to be applied to the first clutch 22, so that the transmission torque of the first clutch 22 is adjusted for starting the vehicle, with an optimum compromise between desired drivability and maximum fuel economy of the vehicle.

Figure 7:
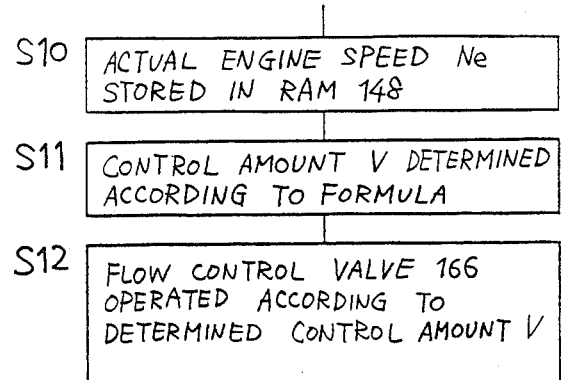
FIG. 7 is a flow chart showing a part of a program used in another embodiment of the invention.

Referring next to FIG. 7, there will be described another form of the control arrangement of the invention for controlling the first clutch 22 upon starting of the vehicle.

In the figure, steps S10, S11 and S12 replace steps S4 through S9 of the embodiment of FIG. 5. In the present modified embodiment, the CPU 152 executes a step (not shown) of storing in the RAM 148 an idling speed Nidl of the engine 10 while the engine 10 is idling. If an affirmative decision is obtained in step S2, the CPU 152 executes step S10 similar to step S6 of FIG. 5, to store the actual engine speed Ne in the RAM 148. Step S10 is followed by step S11 in which a control amount V for controlling the flow control valve 166 is determined based on the stored engine idling speed Nidl and the actual engine speed Ne, according to a predetermined formula (3) indicated below.

$$V = K(Ne - Nidl) \qquad (3)$$

The above formula is determined so as to control the opening of the flow control valve 166, for enabling the first clutch 22 to provide a torque transmission characteristic as provided by an ordinarly centrifugal clutch.

Figure 8:
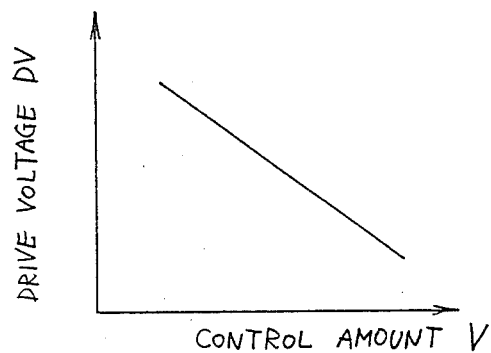
FIG. 8 is a graphical representation of a relationship used in the program shown in the flow chart of FIG. 7.
Figure 9:
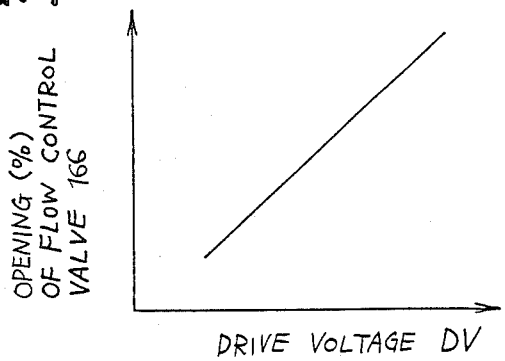
FIG. 9 is a graph indicating a characteristic of a flow control valve used in the embodiments of FIG. 1 and FIG. 7.

In the next step S12, the CPU 152 determines a drive voltage DV according to the determined control amount V, and applies the determined drive voltage DV to the flow control valve 166, thereby changing the opening of this valve. More specifically descrirbed referring to FIGS. 8 and 9, this step S12 is implemented to determine the drive voltage DV based on the control amount V, and according to a relation between the control amount V and the drive voltage DV, as illustrated in FIG. 8. Then, the solenoid coil 234 of the flow control valve 166 is energized with the determined drive voltage DV applied thereto, so that the opening of the flow control valve 166 is adjusted such that the opening is reduced and consequently the torque transmitted by the first clutch 22 is increased, as the difference between the actual engine speed Ne and the engine idling speed Nidl is increased. An operating characteristic of the flow control vavle 166, (i.e., a relationship between the drive voltage DV and the obtained opening of the valve is shown in FIG. 9.

Normally, the actual engine speed Ne directly reflects the operating amount Acc of the accelerator pedal 134, though there exists a slight time lag between changes of these two parameters. In the present embodiment, the opening of the flow control valve 166, which determines the pressure in the first pressure chamber 56, is adjusted based on the operating amount Acc of the accelerator pedal 134 upon starting of the vehicle, and the torque transmitted by the first clutch 22 is accordingly controlled.

While the present invention has been described in its preferred embodiments referring to the accompanying drawings, it is to be understood that the invention may be otherwise embedded.

For example, although the illustrated clutch device 12 consists of the first and second clutches 22, 24, the principle of the invention may apply to a clutch device consisting of the first clutch 22 only.

In the illustrated embodiments, the pressure in the first pressure chamber 56 of the first clutch 22 is lowered to a predetermined low level according to a command from the controller 132, before the accelerator pedal 134 is depressed to start the vehicle (steps S2 and S3 of FIG. 5). Upon depression of the accelerator pedal 134, the first clutch pressure Po to be applied to the first pressure chamber 56 of the first clutch 22 is controlled based on the detected operating amount Acc of the accelerator pedal 134, whereby the transmission torque of the first clutch 22 is controlled. For this purpose, the hydraulic control circuit 156 includes the clutch-pressure adjusting valve 184 for adjusting the line pressure (pressure in the line 174) into the first-clutch pressure Po, according to the control pressure Pc, and further includes the flow control valve 166 whose opening is controlled according to a command from the controller 134, to control the rate of flow of the fluid discharged from the first pressure chamber 56 via the passage 60, and to thereby control the control pressure Pc to be applied to the control pressure chamber 222 of the clutch-pressure adjusting valve 184. However, these pressure adjusting and flow control valves 184, 166 may be replaced by a pressure adjusting servo-valve and a flow control servo-valve, which are controlled by the controller 134, independently of each other. In this case, the first actuator piston 46 is brought to its ready-to-operate position (engagement start position), with a relatively low first-clutch pressure generated by the pressure adjusting servo-valve, and with the flow control servo-valve placed in its fully open position. When the transmission torque of the first clutch 22 is increased to start the vehicle, the pressure adjusting servo-valve generates a relatively high first-clutch pressure, while the opening of the flow control servo-valve is continuously changed so as to regulate the pressure in the first pressure chamber 56 to activate the first piston 46.

While the clutch device 12 in the illustrated embodiment is constructed such that the hydraulically operated actuator pistons 46, 50 are disposed coaxially with the driving and driven rotary members of the clutches 22, 24, the principle of the present invention is also applicable to a clutch device wherein a hydraulically operated cylinder is not coaxial with a clutch, but is disposed merely parallel to the axis of the clutch, as shown in Laid-Open Publication No. 60-11722 (published in 1985) of Japanese Patent Application. In this case, the piston of the hydraulic cylinder consists of a first and a second member which are separate from each other. The first member is operatively connected to the pressure plate (movable member) of the clutch, while the second member is exposed to a hydraulic pressure to move the first member of the piston, and consequently the pressure plate of the clutch. The second member of the piston has a control passage (62) formed therethrough, and a shut-off valve (64) which is adapted to normally close the control passage, and open the passage when the second member has reached a predetermined position relative to the first member of the piston.

While the valving member 70 of the proximity shut-off valve 64 used in the illustrated embodiment has the flange portion 74 integral with the shaft portion 72, the valving member 70 may be a spool movable to close and open the control passage 62 with respect to the first pressure chamber 56.

It is to be understood that the invention is not limited to the illustrated embodiments and the modifications described above, but may be embodied with various other changes, modifications and improvements which may occur to those skilled in the art, without departing from the spirit and scope of the invention defined in the appended claims.

We claim:

1. A hydraulic control device for a hydraulically operated friction clutch device for an automotive vehicle, the clutch device having at least one friction clutch each of which includes a driving rotary member, a driven rotary member, an actuator piston operable for frictional engagement between the driving and driven rotary members, a pressure chamber supplied with a controlled pressurized fluid to move the actuator piston, and a proximity shut-off valve disposed in the actuator piston, for permitting the pressurized fluid to be discharged from the pressure chamber through a discharge passage when the actuator piston has reached a ready-to-operate position from which the actuator piston is moved to start the frictional engagement between the driving and driven rotary members, said hydraulic control device comprising:

a hydraulic pressure source for generating a pressurized fluid having a predetermined line pressure;

a pressure adjusting device for adjusting said line pressure to a controlled clutch pressure to be applied to said pressure chamber;

a clutch control valve for applying said controlled clutch pressure through a fluid passage to said pressure chamber to advance said actuator piston for effecting said frictional engagement of said driving and driven rotary members, said clutch control valve permitting the fluid to be discharged from said pressure chamber through said fluid passage, to permit said actuator piston to be retracted; and control means for commanding said pressure adjusting device to adjust said line pressure to a predetermined lower level, when said clutch control valve is commanded by said control means to supply the pressurized fluid to said pressure chamber for moving said actuator piston to said ready-to-operate position, said predetermined lower level being lower than said controlled clutch pressure applied to said pressure chamber for effecting said frictional engagement.

2. A hydraulic control device according to claim 1, wherein said hydraulic pressure source includes a hydraulic pump, and a pressure relief valve for adjusting a delivery pressure of said hydraulic pump to said line pressure, and said pressure adjusting device includes a clutch-pressure adjusting valve which is disposed between said pressure relief valve and said clutch control valve and which has a control pressure chamber exposed to a control pressure, said clutch-pressure adjusting valve establishing said controlled clutch pressure such that the controlled clutch pressure rises with an increase in said control pressure applied to said control pressure chamber, said pressure adjusting device further including a flow control valve electrically connected to said control means and disposed in said discharge passage for controlling a rate of flow of the fluid discharged through said discharge passage from said pressure chamber of said actuator piston, said control pressure chamber of said clutch-pressure adjusting valve communicating with said discharge passage so that pressure in said discharge passage is applied as said control pressure to said control pressure chamber, whereby said controlled clutch pressure generated by said clutch-pressure adjusting valve is adjusted.

3. A hydraulic control device according to claim 2, wherein said clutch control valve has an inlet port adapted to receive said controlled clutch pressure generated by said clutch-pressure adjusting valve, an output port communicating with said pressure chamber of said actuator piston, and a spool for controlling fluid communication between said inlet and outlet ports.

4. A hydraulic control device according to claim 1, wherein said vehicle has a transmission coupled to said clutch device and having shift positions including at least one forward drive position, and a shift lever for selecting one of said shift positions of the transmission, said control means including a shift-position sensor for detecting said shift positions of the shift lever, and a controller operable to command said pressure adjusting device to adjust said line pressure to said predetermined lower level, when said shift-position sensor detects that said shift lever is placed in one of said at least one forward drive position.

5. A hydraulic control device according to claim 1, wherein said vehicle has an accelerator pedal, and said control means includes an acceleration sensor for detecting an operating amount of said accelerator pedal, and a controller operable to command said pressure adjusting device to determine said controlled clutch pressure based on said operating amount of the accelerator pedal detected by said acceleration sensor.

6. A hydraulic control device according to claim 1, wherein said vehicle has an engine coupled to said clutch device, and an accelerator pedal, and said control means includes an acceleration sensor for detecting an operating amount of said accelerator pedal, a speed sensor for detecting an actual speed of the engine, and a controller operable to determine a target speed of said engine based on the detected operating amount of the accelerator pedal, and according to a predetermined relation between the operating amount of the accelerator pedal and the target engine speed, said controller commanding said pressure adjusting device to determine said controlled clutch pressure so that the detected actual speed of the engine coincides with the determined target speed.

7. A hydraulic control device according to claim 1, wherein said vehicle has an engine coupled to said clutch device, and said control means includes a speed sensor for detecting an actual speed of the engine, and a controller operable to command said pressure adjusting device to determine said controlled clutch pressure so as to cause said actuator piston to effect the frictional engagement between said driving and driven rotary members such that a torque transmitted by said clutch device is increased during starting of the vehicle, as a function of a difference between the actual speed of the engine detected while the engine is being started, and the actual speed of the engine detected while the engine is idling.

* * * * *